3,157,516
PROCESS OF PREPARING A FLAVORING SUBSTANCE AND THE RESULTING PRODUCT

Louis J. Huber and Simpey Kuramoto, Minneapolis, and Fred Smith, Wayzata, Minn., assignors to General Mills, Inc., a corporation of Delaware
No Drawing. Filed May 18, 1962, Ser. No. 195,965
9 Claims. (Cl. 99—140)

The present invention relates to artificial flavoring substances, the preparation thereof and the use thereof in simulated food products.

Various synthetic meat products have recently been prepared from edible proteins. Thus, fibrous products have been prepared from proteins such as soy protein, by forming a spinning dope from said protein, extruding the dope through a porous membrane into an acid-salt precipitating bath to form filaments or fibers, stretching said filaments to orient the molecules thereof, neutralizing the filaments to a pH of about 4.0 to 7.0 and then binding said filaments by suitable means to form the fibrous meat products. Other simulated meat products have been prepared from wheat gluten by heating the wet gluten to cause the same to set-up. In order that the above-described products simulate meat not only as to texture, but also as to flavor and color, various flavoring agents and dyes are added thereto. Many of the flavoring agents used heretofore are unsatisfactory and/or do not adequately give the meats the desired flavors.

Accordingly, it is an object of the present invention to provide novel artificial flavoring substances.

Another object of the invention is to provide a method for the preparation of such artificial flavoring substances from relatively inexpensive starting materials.

An additional object of the inevntion is to provide simulated meat products containing the novel artificial flavoring substances.

These and other objects will become apparent from the following detailed description.

We have discovered that artificial flavoring substances having flavor and aroma reminiscent of chicken, turkey and/or tuna can be prepared by the reaction of ascorbic or isoascorbic acid and cysteine. Such flavoring substances can be used in a wide variety of simulated meat products.

The flavoring substances are obtained by using cysteine or simple derivatives thereof, such as salts or esters. Also, peptides, such as glutathione, or proteins which will give rise to cysteine under the conditions of the reaction can be used. Additionally, either optical isomer, DL-cysteine or L-cysteine, can be employed.

The molar ratio of the above-described cysteine reactant and the ascorbic or isoascorbic acid is preferably in the range of 0.05:1 to 1:0.05. Ratios of about 0.75:1 to 1:0.75 are particularly preferred.

The reaction is carried out at elevated temperatures and in the presence of water. It is most conveniently carried out by heating the mixture of the cysteine compound, ascorbic or isoascorbic acid and water under reflux conditions. Thus, a preferred temperature is about 100° C. The length of heating will vary considerably and will depend somewhat on the reaction temperature and the specific reactants. At lower temperatures, such as about 75° C., the reaction may take 10 to 25 hours or more before the desired flavoring substance is obtained. At reflux temperatures, the reaction is usually complete within about 1 to 4 hours. The amount of water used is not critical either. Amounts thereof of about 1 to 50 times the total weight of the cysteine compound and ascorbic or isoascorbic acid are preferred.

The reaction products may be used in the form of water solutions or they can be dried. Additionally, the reaction can be carried out by adding the reactants to a simulated meat product, followed by heating. Thus, for example, the cysteine compound and ascorbic or isoascorbic acid can be added to wet gluten (plus any other desired addition agent) and the whole product set-up by heating. Generally, the food products will contain sufficient water to enable the reaction to proceed.

The following examples are given by way of illustration only and are not to be construed as limiting the invention thereto.

Example I

To a reaction vessel fitted with a reflux condenser and a thermometer were added 1.76 g. ascorbic acid, 1.75 g. cysteine hydrochloride and 100 ml. water. The mixture was heated under reflux at 100° C. for 2 hours. The product, a tan to brown-colored, clear solution, had flavor and aroma resembling that of chicken and tuna.

Example II

Example I was repeated using 3 g. ascorbic acid, 3 g. cysteine hydrochloride and 150 ml. water. The product had substantially the same color, flavor and aroma of the product of Example I.

Example III

One hundred grams of an acid-salt soy protein fiber suspension (50% by weight water) which had been aged for about 7 days was added to two liters of an aqueous salt solution (1% NaCl). The initial pH of 3.0–3.5 was raised to a final pH of 5.0–5.5 by the addition of $Na_2SO_3$. After about 30 minutes had elapsed, the fibers were squeezed through rubber rolls and rinsed one time in 1% NaCl solution. The fibers were again passed through rubber squeeze rolls to remove excess liquid and were then impregnated with the following materials:

| | Amount |
|---|---|
| Egg albumen | g— 7.0 |
| Non-fat milk solids | g— 2.0 |
| Flour | g— 2.0 |
| Flavoring substance of Example I | ml— 1.0 |
| Water | ml— 50 |
| Vegetable oil (corn) | g— 10 |

The impregnated fiber tow was set-up by heat and cut into small cubes (¼–½ inch) which were dried in a forced draft oven to a final moisture content of 5–10%. The dried chunks were placed in a noodle casserole and after 20 minutes' cooking, they rehydrated to yield simulated meat pieces which had excellent eating qualities and had the flavor and aroma of cooked chicken meat.

The above examples show that artificial flavoring substances can be prepared according to the present invention which have chicken, turkey or tuna aroma and flavor and which can be used in simulated meat products. Equally good results are obtained from isoascorbic acid and other cysteine compounds.

It is understood that the flavoring agents can be used in a wide variety of food products such as soups, simulated meats, hot dishes and the like. The simulated meats may be prepared from spun protein fibers, set-up wheat gluten and the like. As such they may contain various binders, dyes, fats or oils, other flavoring agents and the like. The amounts of our flavoring substances added to the food products can vary widely and will be based on the flavor and aroma desired. Preferably about 0.1 to 5.0% by weight of the flavoring substances are added to the food products.

It is also to be understood that the invention is not to be limited to the exact details of operation or the compositions and methods shown and described, as obvious modifications will be apparent to those skilled in the art and the invention is to be limited only by the scope of the appended claims.

The embodiments of the invention in which an exclusive property or privilege is claimed are defined as follows:

1. A process of preparing a flavoring substance which comprises reacting an acid selected from the group consisting of ascorbic acid and isoascorbic acid with a cysteine compound in the presence of water at an elevated temperature.

2. The process of claim 1 wherein the acid is ascorbic acid and the cysteine compound is cysteine hydrochloride.

3. The process of claim 1 wherein the molar ratio of acid to cysteine compound is in the range of about 0.05:1 to 1:0.05.

4. The process of claim 1 wherein the reaction is carried out under reflux.

5. The flavoring substance prepared by the process of claim 1.

6. The flavoring substance prepared by the process of claim 2.

7. A simulated meat product containing a small amount of the flavoring substance of claim 5.

8. The simulated meat product of claim 7 derived from spun edible protein fibers.

9. The simulated meat product of claim 7 derived from set-up gluten.

References Cited in the file of this patent

UNITED STATES PATENTS

| | | |
|---|---|---|
| 2,830,902 | Anson et al. | Apr. 15, 1958 |
| 2,934,436 | May et al. | Apr. 26, 1960 |
| 2,934,437 | Morton et al. | Apr. 26, 1960 |

FOREIGN PATENTS

| | | |
|---|---|---|
| 699,692 | Great Britain | Nov. 11, 1953 |